(12) United States Patent
Liu

(10) Patent No.: US 12,532,042 B2
(45) Date of Patent: Jan. 20, 2026

(54) SYNCHRONOUS PLAYBACK METHOD, TERMINAL DEVICE AND STORAGE MEDIUM

(71) Applicant: Beijing Zitiao Network Technology Co., Ltd., Beijing (CN)

(72) Inventor: Tianhao Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/843,677

(22) PCT Filed: Feb. 22, 2023

(86) PCT No.: PCT/CN2023/077529
§ 371 (c)(1),
(2) Date: Sep. 3, 2024

(87) PCT Pub. No.: WO2023/165384
PCT Pub. Date: Sep. 7, 2023

(65) Prior Publication Data
US 2025/0184560 A1     Jun. 5, 2025

(30) Foreign Application Priority Data
Mar. 3, 2022   (CN) .......................... 202210204584.9

(51) Int. Cl.
H04N 21/43       (2011.01)
(52) U.S. Cl.
CPC ............................ H04N 21/43076 (2020.08)
(58) Field of Classification Search
None
See application file for complete search history.

(56) References Cited

U.S. PATENT DOCUMENTS 11,082,742 B2 *   8/2021   Hernejärvi ......... H04N 21/4532
11,540,012 B2 *  12/2022   Hernejärvi ........... H04N 21/439
(Continued)

FOREIGN PATENT DOCUMENTS

CN      105072482 A    11/2015
CN      105264902 A     1/2016
(Continued)

OTHER PUBLICATIONS

Cao et al., "Research of the Audio-Video Synchronous Technology for Video Conference System over IP", Chinese Journal of Image and Graphics, vol. 10, Issue 2, Feb. 28, 2005, 5 pages, with English translation of Abstract.
(Continued)

Primary Examiner — William J Kim
(74) Attorney, Agent, or Firm — Astute IP Law Group

(57) ABSTRACT

Embodiments of the present disclosure a synchronous playback method, device, terminal device, and storage medium, the method includes in response to acquiring a message sent by a second client in a playback group, determining whether a first playback control operation number in the message is greater than a current playback control operation number of the first client; in a case where the first playback control operation number is greater than the current playback control operation number, updating the current playback control operation number to the first playback control operation number, and updating current playback information according to a playback information snapshot in the message; in a case where the first playback control operation number is smaller than the current playback control operation number, discarding the message.

19 Claims, 5 Drawing Sheets

(56) References Cited

U.S. PATENT DOCUMENTS

| | | | | |
|---|---|---|---|---|
| 11,683,553 | B2* | 6/2023 | Dutta | H04N 21/458 725/32 |
| 12,052,467 | B2* | 7/2024 | Hernejärvi | H04N 21/44222 |
| 12,069,331 | B2* | 8/2024 | Dutta | H04N 21/4532 |
| 12,375,771 | B2* | 7/2025 | Panchaksharaiah | H04N 21/2402 |
| 2010/0202761 | A1 | 8/2010 | Bhogal | H04N 21/4788 386/241 |
| 2011/0218656 | A1 | 9/2011 | Bishop et al. | |
| 2012/0039578 | A1* | 2/2012 | Issa | H04N 21/47217 725/109 |
| 2012/0117488 | A1* | 5/2012 | Amidon | H04N 21/4622 715/753 |
| 2012/0131110 | A1* | 5/2012 | Buyukkoc | H04N 21/43076 709/248 |
| 2014/0096169 | A1* | 4/2014 | Dodson | H04N 21/6543 725/97 |
| 2014/0214920 | A1* | 7/2014 | Wong | H04L 65/60 709/203 |
| 2018/0262792 | A1* | 9/2018 | Mackay | H04N 21/44227 |
| 2018/0352303 | A1* | 12/2018 | Siddique | H04L 65/1069 |
| 2019/0222803 | A1* | 7/2019 | Pather | H04L 65/765 |
| 2019/0268669 | A1 | 8/2019 | Song et al. | |
| 2021/0281909 | A1 | 9/2021 | Xiong | |
| 2021/0289255 | A1 | 9/2021 | Balint et al. | |
| 2021/0352359 | A1* | 11/2021 | Barvo | H04N 21/2187 |
| 2022/0295131 | A1* | 9/2022 | Shah | H04N 21/8456 |
| 2023/0007342 | A1* | 1/2023 | Shah | H04N 21/439 |
| 2023/0138329 | A1* | 5/2023 | Dutta | H04N 21/4532 725/32 |

FOREIGN PATENT DOCUMENTS

| | | |
|---|---|---|
| CN | 105898508 A | 8/2016 |
| CN | 106331821 A | 1/2017 |
| CN | 108038658 A | 5/2018 |
| CN | 108449620 A | 8/2018 |
| CN | 110719516 A | 1/2020 |
| CN | 111064987 A | 4/2020 |
| CN | 111107412 A | 5/2020 |
| CN | 111447480 A | 7/2020 |
| CN | 112069353 A | 11/2020 |
| CN | 113242291 A | 8/2021 |
| CN | 113411652 A | 9/2021 |
| CN | 114584822 A | 6/2022 |
| CN | 114584822 B | 9/2023 |
| JP | 2016057709 A | 4/2016 |
| JP | 2016192743 A | 11/2016 |
| KR | 1020200084854 A | 7/2020 |
| WO | 2017088383 A1 | 6/2017 |

OTHER PUBLICATIONS

Chen Jiaojiao, "Research and Design of Synchronous Interactive Classroom Supervision Platform Based on Cloud Architecture", Chinese Excellent Master's Thesis Full Text Database, Issue 1, Jan. 15, 2021, 87 pages, with English translation of Abstract.

Fonseca et al., "Using distributed servers to provide distributed home theatre services", ITS'98 Proceedings, SBT/IEEE International Telecommunications Symposium (Cat. No.98EX202) Aug. 6, 2002, 6 pages.

International Search Report and Written Opinion for PCT/CN2023/077529, mailed Jun. 19, 2023 17 pages.

Notice of Allowance for Chinese Patent Application No. 202210204584.9, mailed Aug. 22, 2023, 9 pages.

* cited by examiner

In response to acquiring the playback control operation of the first client, acquiring a second playback control operation number of the playback control operation; the second playback control operation number includes a playback control count value and an intra group serial number of the first client ⟶ S310

Updating the current playback control operation number of the first client to the second playback control operation number, and updating the current playback information according to the playback control operation ⟶ S320

Sending the second playback control operation number and playback information snapshot to other clients in the playback group through a message to guide the other clients to update their current playback control operation numbers and current playback information according to the message ⟶ S330

Fig. 3

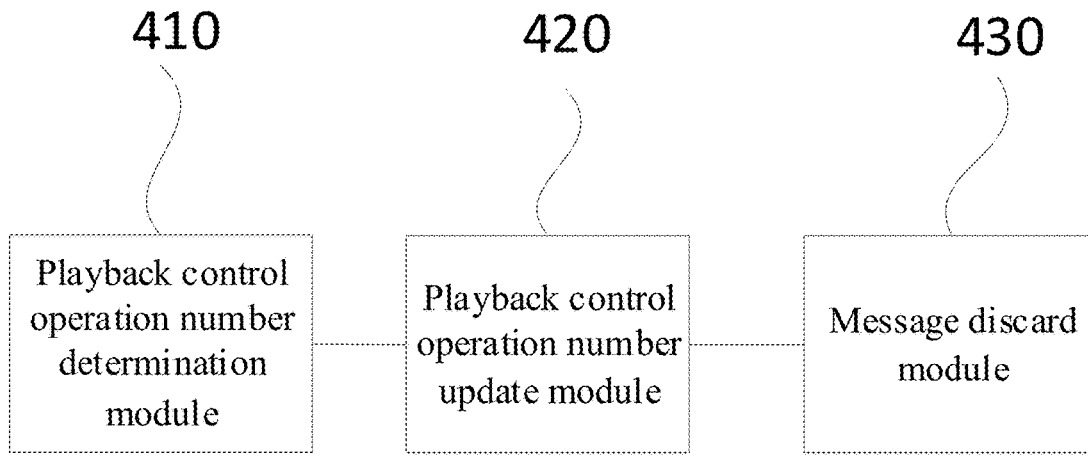

Fig. 4

SYNCHRONOUS PLAYBACK METHOD, TERMINAL DEVICE AND STORAGE MEDIUM

CROSS REFERENCE TO RELATED APPLICATIONS

This is a national stage application based on International Patent Application No. PCT/CN2023/077529, filed Feb. 22, 2023, which claims priority to Chinese Patent Application No. 202210204584.9 filed on Mar. 3, 2022, the disclosures of which are incorporated herein by reference in their entireties.

TECHNICAL FIELD

Embodiments of the present disclosure relate to information sharing technology, for example, to a synchronous playback method, a device, a terminal device, and a storage medium.

BACKGROUND

With the continuous development of network technologies, experience sharing in the pan entertainment scene has become the attention focus in the Internet field. Through the playback control of audio and video information, all sharing participants enjoy the audio and video information synchronously, and experience shared playback control.

In related technologies, the participants in sharing audio and video information are divided into different identities. Taking the online meeting with video sharing as an example, the participant identities include host, guest, and audience. The host has video control permissions such as switching and pausing, and can interact with guests through voice; the guest can watch videos shared by the host and interact with the host, but does not have video control permissions; the audience can only watch videos shared by the host, but cannot interact with the host, and does not have video control permissions.

However, in this sharing method, each sharing participant does not actually have the same control permissions, shared playback control is not implemented, the participation degree of sharing participants is extremely low, and the user experience is poor.

SUMMARY

The present disclosure provides a synchronous playback method, device, terminal device, and storage medium to ensure the playback information of various users in a playback group to be consistent through shared playback control.

In the first aspect, embodiments of the present disclosure provide a synchronous playback method, which includes:
  in response to acquiring a message sent by a second client in a playback group, determining whether a first playback control operation number in the message is greater than a current playback control operation number of the first client; in which the first playback control operation number includes a playback control count value and an intra group serial number of the second client in the playback group;
  in response to the first playback control operation number being greater than the current playback control operation number, updating the current playback control operation number to the first playback control operation number, and updating current playback information according to a playback information snapshot in the message; and
  in response to the first playback control operation number being smaller than the current playback control operation number, discarding the message.

In the second aspect, embodiments of the present disclosure provide a synchronous playback device, which includes:
  a playback control operation number determination module, configured to, in response to receiving a message sent by a second client in a playback group, determine whether a first playback control operation number in the message is greater than a current playback control operation number of a first client; in which the first playback control operation number includes a playback control count value and an intra group serial number of the second client in the playback group;
  a playback control operation number update module, configured to update the current playback control operation number to the first playback control operation number in response to the first playback control operation number being greater than the current playback control operation number, and update the current playback information according to a playback information snapshot in the message; and
  a message discard module, configured to discard the message in response to the first playback control operation number being smaller than the current playback control operation number.

In the third aspect, embodiments of the present disclosure provide a terminal device, which includes a memory, a processing device, and a computer program stored in the memory and capable of running on the processing device, the processing device implements the synchronous playback method provided by the embodiments of the present disclosure when executing the computer program.

In the fourth aspect, embodiments of the present disclosure provide a storage medium, which includes a computer executable instruction, the computer executable instruction is configured to execute the synchronous playback method provided by the embodiments of the present disclosure when executed by a computer processor.

BRIEF DESCRIPTION OF DRAWINGS

Throughout the figures, the same or similar reference numbers indicate the same or similar elements. It should be understood that the attached figures are illustrative, and the components and elements may not necessarily be drawn to scale.

FIG. 3 is a flowchart of an embodiment of further another synchronous playback method of the present disclosure;

FIG. 4 is a structural block diagram of a synchronous playback device in the embodiment 4 of the present disclosure.

DETAILED DESCRIPTION

Embodiments of the present disclosure are described in more detail below with reference to the drawings.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "at least one".

The names of the messages or information exchanged between multiple devices in the embodiments of the present disclosure are for illustrative purposes only and are not intended to limit the scope of these messages or information.

Embodiment 1

Figure 1A:
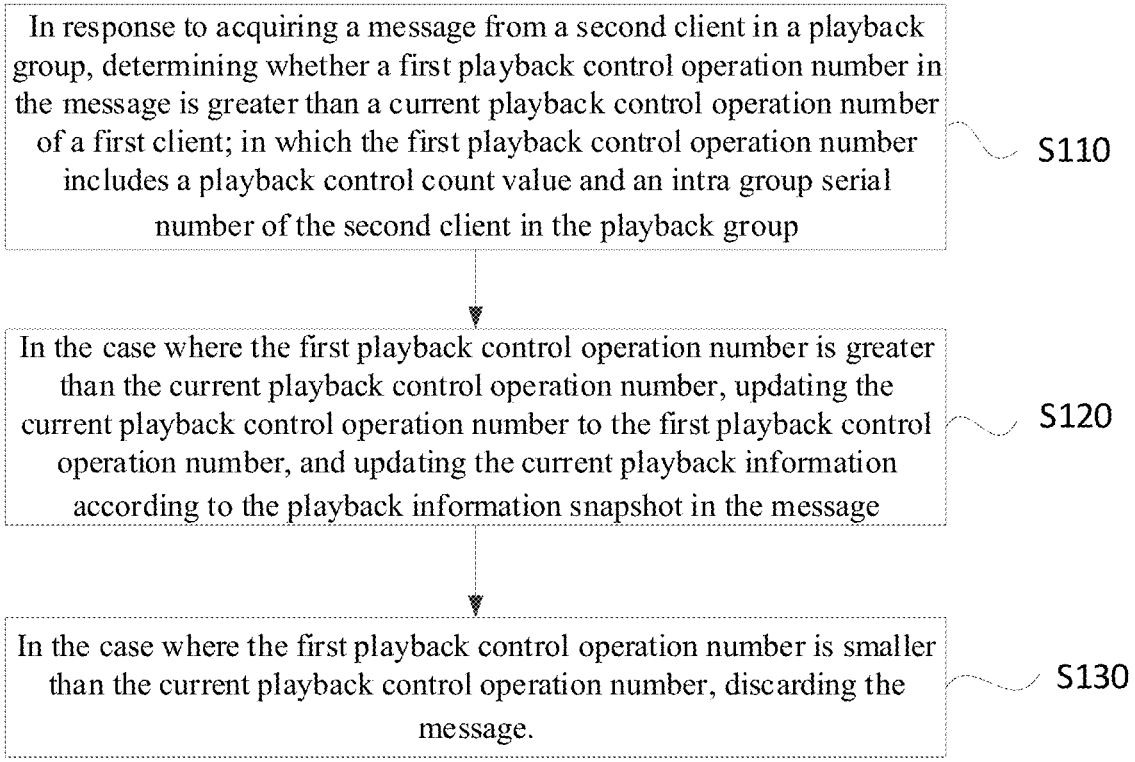
FIG. 1A is a flowchart of an embodiment of a synchronous playback method of the present disclosure.

FIG. 1A is a flowchart of a synchronous playback method provided by the embodiment 1 of the present disclosure. This embodiment can be applicable to the current client updating the current playback information according to the playback control operations of other clients in the playback group. The method can be executed by the synchronous playback device in the embodiments of the present disclosure, the device can be implemented through software and/or hardware and integrated into the client. The client can be installed in terminal devices such as mobile phones or computers. The method includes the following steps.

S110: in response to acquiring a message from a second client in a playback group, determining whether a first playback control operation number in the message is greater than a current playback control operation number of a first client; in which the first playback control operation number includes a playback control count value and an intra group serial number of the second client in the playback group.

The playback group is a sharing group of audio and/or video information created by users. Each user in the playback group has the same playback control permission in the group, and the same playback information is displayed in each client; the playback information includes the current audio and video information being played, playback progress, playback status (pause, stop, or play), playlist loop mode, and other business information (such as whether it has been liked or bookmarked).

The first client creates a playback group and records a group identifier of the playback group and an intra group serial number of the first client in the playback group in response to acquiring a creation instruction of the playback group sent by users; the group identifier is the identification information assigned by the server to the playback group; the intra group serial number is the intra group identification assigned by the server to each client according to the order in which the clients join the playback group; when the first client is the creator of the playback group, it is obvious that the intra group serial number of the first client is 1, that is, the client is the first client to join the playback group; the first client sends an invitation request to at least one target client to guide them to join the playback group in response to acquiring a sharing instruction of the playback group sent by users.

In response to acquiring the invitation request of the playback group sent by other clients, the first client displays the invitation request to the user, and when receiving a join instruction sent by the user, joins the playback group and records the group identification of the playback group and the intra group serial number of the first client in the playback group; when the first client is not the creator of the playback group, it is obvious that the intra group serial number of the first client is not 1. The server assigns the intra group serial number to the first client according to the order in which the first client joins the playback group. For example, if the first client is the second client to join the playback group, the intra group serial number of the first client assigned by the server is 2.

When users control playback in the playback group through the client, the client will assign a playback control operation number to each playback control operation action; the playback control operation number includes an intra group serial number and a playback control count value, and it may be represented by K=[M, N]; K is the playback control operation number, M is the intra group serial number, N is the playback control count value. The intra group serial number is the intra group serial number of the current client in the playback group, and the playback control count value is the number of playback control operations triggered by all clients in the playback group and recorded by the current client. When the client acquires the user's playback control operation action, it will add 1 to the current playback control count value. For example, if the playback control count value in the current playback control operation number of the first client is 4, the first client will add 1 to the playback control count value when it acquires the user's playback control operation action, that is, the playback control count value will be updated to 5; playback control operations include pausing playback, starting playback, switching to the next track, switching list loop mode, adjusting playback progress, and other business operations (such as liking, bookmarking).

When comparing the size of two playback control operation numbers, the comparison is made by comparing the playback control count values. The larger the playback control count value is, the larger the playback control operation number is, and the smaller the playback control count value is, the smaller the playback control operation number is. Specifically, when the first client joins the playback group as the creator of the playback group, the current playback control operation number at the initial time is [1, 0], which indicates that the current playback control operation number is the playback control operation number of the playback control operation action triggered by itself. Therefore, the intra group serial number is the intra group serial number of itself, which is 1. At the same time, because there is no client triggering the playback control operation action in the playback group, the playback control count value is 0; when the first client is not the creator of the playback group and is the M-th client joins the playback group, the current playback control operation number at the initial time is [M, 0], which indicates that the current playback control operation number is the playback control operation number of the playback control operation action triggered by itself, and therefore the intra group serial number is the intra group serial number of itself, which is M. At the same time, because there is no client triggering a playback control operation action in the playback group, the playback control count value is 0. In the embodiments of the present disclosure, the message is implemented based on declarative programming to avoid the loss of playback information through a declarative synchronous message protocol, and therefore avoids the problem of permanent inconsistency of playback information.

Optionally, in the embodiments of the present disclosure, determining whether the first playback control operation number in the message is greater than the current playback control operation number of the first client includes: in the case where the playback control count value of the first playback control operation number is equal to the playback control count value of the current playback control operation number, determining whether the intra group serial number of the first playback control operation number is greater than the intra group serial number of the current playback control operation number; in the case where the intra group serial number of the first playback control operation number is greater than the intra group serial number of the current playback control operation number, determining that the first playback control operation number is smaller than the current playback control operation number; in the case where the intra group serial number of the first playback control operation number is smaller than the intra group serial number of the current playback control operation number, determining that the first playback control operation number is greater than the current playback control operation number.

For example, when comparing the sizes of two playback control operation numbers, in the case where the playback control count values are equal, the sizes of the two playback control operation numbers are compared by comparing the intra group serial numbers. The smaller the intra group serial number is, the earlier the client joins the playback group, and the larger the intra group serial number is, the later the client joins the playback group. Therefore, when the playback control count values of the two playback control operation numbers are equal, the playback control operation number of the client who joined the playback group earlier is larger to ensure that when the playback control count values are equal, the creator of the playback group (with intra group serial number 1) and the earlier joiner (with smaller intra group serial number) control the playback information, while ensuring the consistency of the playback information for each client in the playback group.

Optionally, in the embodiments of the present disclosure, the first playback control operation number further includes playback control triggering time; determining whether the first playback control operation number in the message is greater than the current playback control operation number of the first client further includes: in the case where the playback control count value of the first playback control operation number is equal to the playback control count value of the current playback control operation number, determining whether the playback control triggering time of the first playback control operation number is closer to the current time than the playback control triggering time of the current playback control operation number; in the case where the playback control triggering time of the first playback control operation number is closer to the current time than the playback control triggering time of the current playback control operation number, determining that the first playback control operation number is greater than the current playback control operation number; in the case where the playback control triggering time of the first playback control operation number is further from the current time than the playback control triggering time of the current playback control operation number, determining that the first playback control operation number is smaller than the current playback control operation number.

For example, when comparing the sizes of two playback control operation numbers, in the case where the playback control count values are equal, the sizes of the two playback control operation numbers can also be compared by comparing the playback control triggering time. The closer the playback control triggering time is to the current time, the more it can reflect the user's current real playback control intention. The stronger the execution effect of the playback control operation action is, the further the playback control triggering time is to the current time, the weaker the execution effect of its playback control operation action is. Therefore, when the playback control count values of the two playback control operation numbers are equal, the playback control operation number that is closer to the current time is larger, to ensure that when the playback control count values are equal, the control of playback information is completed according to the user's current real playback control intention, while ensuring the consistency of playback information of various clients in the playback group.

S120: in the case where the first playback control operation number is greater than the current playback control operation number, updating the current playback control operation number to the first playback control operation number, and updating the current playback information according to the playback information snapshot in the message.

In the case where the acquired first playback control operation number sent by the second client is greater than the current playback control operation number, updating the current playback control operation number to the first playback control operation number. At the same time, updating the current playback information according to the playback information snapshot in the message, so that the playback information displayed by the first client is consistent with the playback information displayed by the second client, thereby ensuring the consistency of the playback information in the playback group.

S130: in the case where the first playback control operation number is smaller than the current playback control operation number, discarding the message.

In the case where the acquired first playback control operation number sent by the second client is smaller than the current playback control operation number, the received message will be discarded to ensure that the second client returns to normal network state from weak or disconnected network state. When issuing the playback information snapshot, the first client will not adopt the playback information snapshot of the broadcast information to avoid the first client's bounce back on the playback information, in which the bounce back may lead to inconsistent playback; taking the schematic diagram of the synchronous playback process shown in FIG. 1B as an example, in FIG. 1B, the playback control operation number is represented by "LT", the current playback information is represented by "V", and the value of "V" is used to represent the current playback information. This value itself does not have practical significance and can be any value, it is only used to indicate whether the current playback information in each client is the same. In the case where the value is the same, it indicates that the current playback information is the same. In the case where the value is different, it indicates that the current playback information is different.

Figure 1B:
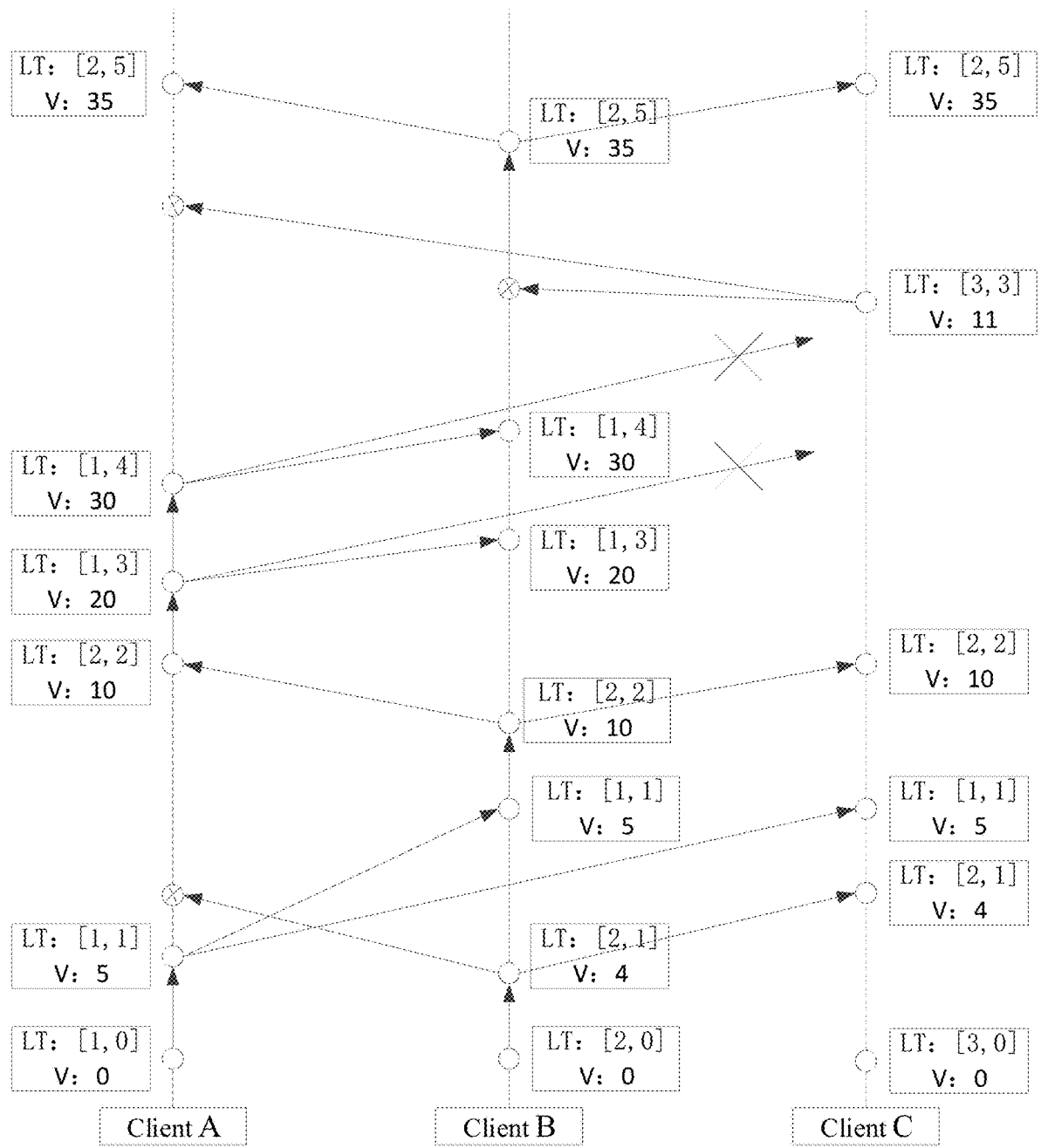
FIG. 1B is a schematic diagram of a synchronous playback process of the present disclosure.

As shown in FIG. 1B, after client A creates the playback group, client B and client C join the playback group in sequence; at the initial moment, the current playback control operation numbers for client A, client B, and client C are [1, 0], [2, 0], [3, 0], respectively, indicating that the current playback control operation numbers are all playback control operation numbers of the playback control operation actions triggered by the client itself. Moreover, because there are no clients triggering any playback control operation actions in the playback group, none of the aforementioned clients have acquired any playback control operation actions. Therefore, the playback control count values are all 0; in this case, the current playback information of client A, client B, and client C are the same, all of which are preset initial playback information (such as displaying a blank directory without songs), represented by V: 0; then, client B performs a playback control operation, which adds 1 to the current playback control count value (i.e., 0), the current playback control operation number is changed to [2, 1], and the playback information is 4; client B sends LT: [2, 1], V: 4 to client A and client C.

Before acquiring the message sent by client B, client A also performs a playback control operation by itself. Client A adds 1 to the current playback control count value (i.e., 0), and in this case, the current playback control operation number of client A is changed to [1, 1], and the playback information is 5; after receiving the message sent by client B, client A compares the current playback control operation number [1, 1] with the received playback control operation number [2, 1]. Based on the above comparison rules, it is determined that [1, 1] is greater than [2, 1], that is, the current playback control operation number is greater than the received playback control operation number. Therefore, the message is discarded (corresponding to the node represented by ⊗ in FIG. 1B), that is, the current playback control operation number [1, 1] is retained, and the playback information continues to be played according to the original playback information and not updated according to the playback information V: 4 of client B; after acquiring the message sent by client B, client C compares the current operation version number [3, 0] with the received operation version number [2, 1] and determines that [3, 0] is smaller than [2, 1], that is, the current playback control operation number is smaller than the received playback control operation number. Therefore, client C updates the current playback control operation number to LT: [2, 1] and updates the playback information to V: 4.

After changing the current playback control operation number to [1,1] and changing the playback information to 5, client A sends LT: [1,1] and V: 5 to client B and client C; client B compares the current playback control operation number [2, 1] with the received playback control operation number [1, 1], and determines that [2, 1] is smaller than [1, 1], that is, the current playback control operation number is smaller than the received playback control operation number. Therefore, the current playback control operation number is updated to LT: [1, 1], and the playback information is updated to V: 5; client C compares the current playback control operation number [2, 1] with the received playback control operation number [1, 1], and determines that [2, 1] is smaller than [1, 1], that is, the current playback control operation number is smaller than the received playback control operation number. Therefore, the current playback control operation number is also updated to LT: [1, 1], and the playback information is updated to V: 5, which ensures the consistency of playback information of various clients in the playback group.

Then, client B performs another playback control operation, and adds 1 to the current playback control count value (i.e., 1). The current playback control operation number is changed to [2,2], and the playback information is 10; client B sends LT: [2, 2], V: 10 to client A and client C; client A compares the current playback control operation number [1, 1] with the received playback control operation number [2, 2], and determines that [1, 1] is smaller than [2, 2], that is, the current playback control operation number is smaller than the received playback control operation number. Therefore, the current playback control operation number is updated to LT: [2, 2], and the playback information is updated to V: 10; client C compares the current playback control operation number [1, 1] with the received playback control operation number [2, 2], and determines that [1, 1] is smaller than [2, 2], that is, the current playback control operation number is smaller than the received playback control operation number. Therefore, the current playback control operation number is updated to LT: [2, 2], and the playback information is updated to V: 10, thereby once again ensuring the consistency of playback information of various clients in the playback group.

Next, client A performs one playback control operation again. Client A adds 1 to the current playback control count value (i.e., 2). In this case, the current playback control operation number of client A is changed to [1, 3], and the playback information is 20. Client A sends LT: [1, 3], V: 20 to client B and client C; client B compares the current playback control operation number [2, 2] with the received playback control operation number [1, 3], and determines that [2, 2] is smaller than [1, 3], that is, the current playback control operation number is smaller than the received playback control operation number. Therefore, the current playback control operation number is updated to LT: [1, 3], and the playback information is updated to V: 20; due to being in a disconnected (or weak) network state, client C does not receive the playback information sent by client A. Therefore, the current playback control operation number in client C is still [2,2], and the playback information continues to be played according to the original playback information.

Then, client A performs one playback control operation again, and adds 1 to the current playback control count value (i.e., 3). In this case, the current playback control operation number of client A is changed to [1,4], and the playback information is 30. Client A sends LT: [1,4], V: 30 to client B and client C; client B compares the current playback control operation number [1, 3] with the received playback control operation number [1, 4], and determines that [1, 3] is smaller than [1, 4], that is, the current playback control operation number is smaller than the received playback control operation number. Therefore, the current playback control operation number is updated to LT: [1, 4], and the playback information is updated to V: 30; client C is still in a disconnected (or weak) network state and does not receive the playback information sent by client A at this time. Therefore, the current playback control operation number in client C is still [2,2], and the playback information continues to be played according to the original playback information.

After the network status of client C restores to normal, one playback control operation is performed in client C. Client C adds 1 to the current playback control count value (i.e., 2). In this case, the current playback control operation number of client C is changed to [3,3], and the playback information is 11. Client C sends LT: [3,3], V: 11 to both client A and client B; after receiving the message sent by client C, both client A and client B compare the current playback control operation number [1, 4] with the received playback control operation number [3, 3], and determine that [1, 4] is greater than [3, 3], that is, the current playback control operation number is greater than the received playback control operation number. Therefore, the message is discarded, and the current playback control operation number LT: [1, 4] is retained. The playback information continues to be played according to the original playback information, and is not updated according to the playback information V: 11 of client C, which ensures that in the case where client C recovers from a weak or disconnected network state to a normal network state, and issues a playback information snapshot, client A and client B do not accept the playback information snapshot of the playback information, thereby avoiding the bouncing back of the playback information by client A and client B, and avoiding the occurrence of inconsistent playback; at the same time, it also ensures the consistency of playback information of client A and client B which have normal network states within the playback group.

Then, client B performs one playback control operation again, and adds 1 to the current playback control count value (i.e., 4). The current playback control operation number is changed to [2,5], and the playback information is 35; client B sends LT: [2, 5], V: 35 to client A and client C; client A compares the current playback control operation number [1, 4] with the received playback control operation number [2, 5], and determines that [1, 4] is smaller than [2, 5], that is, the current playback control operation number is smaller than the received playback control operation number. Therefore, the current playback control operation number is updated to LT: [2, 5], and the playback information is updated to V: 35; client C compares the current playback control operation number [3, 3] with the received playback control operation number [2, 5], and determines that [3, 3] is smaller than [2, 5], that is, the current playback control operation number is smaller than the received playback control operation number. Therefore, the current playback control operation number is updated to LT: [2, 5], and the playback information is updated to V: 35, which once again ensures the consistency of playback information of various clients in the playback group at this time.

In the technical solution of the embodiments of the present disclosure, acquiring the message sent by other clients in the playback group, determining that the first playback control operation number in the message is greater than the current playback control operation number of the current client, updating the current playback control operation number to the first playback control operation number, and updating the current playback information according to the playback information snapshot in the message, so that all users in the playback group have the same control permissions, thereby improving the sharing participation degree of users and ensuring the consistency of the playback information in the playback group. When it is determined that the first playback control operation number is smaller than the current playback control operation number, discarding the message to avoid the playback control operations of network abnormal clients to cause the playback information of normal network clients to bounce back, and ensuring the continuity of the playback information.

Embodiment 2

Figure 2:
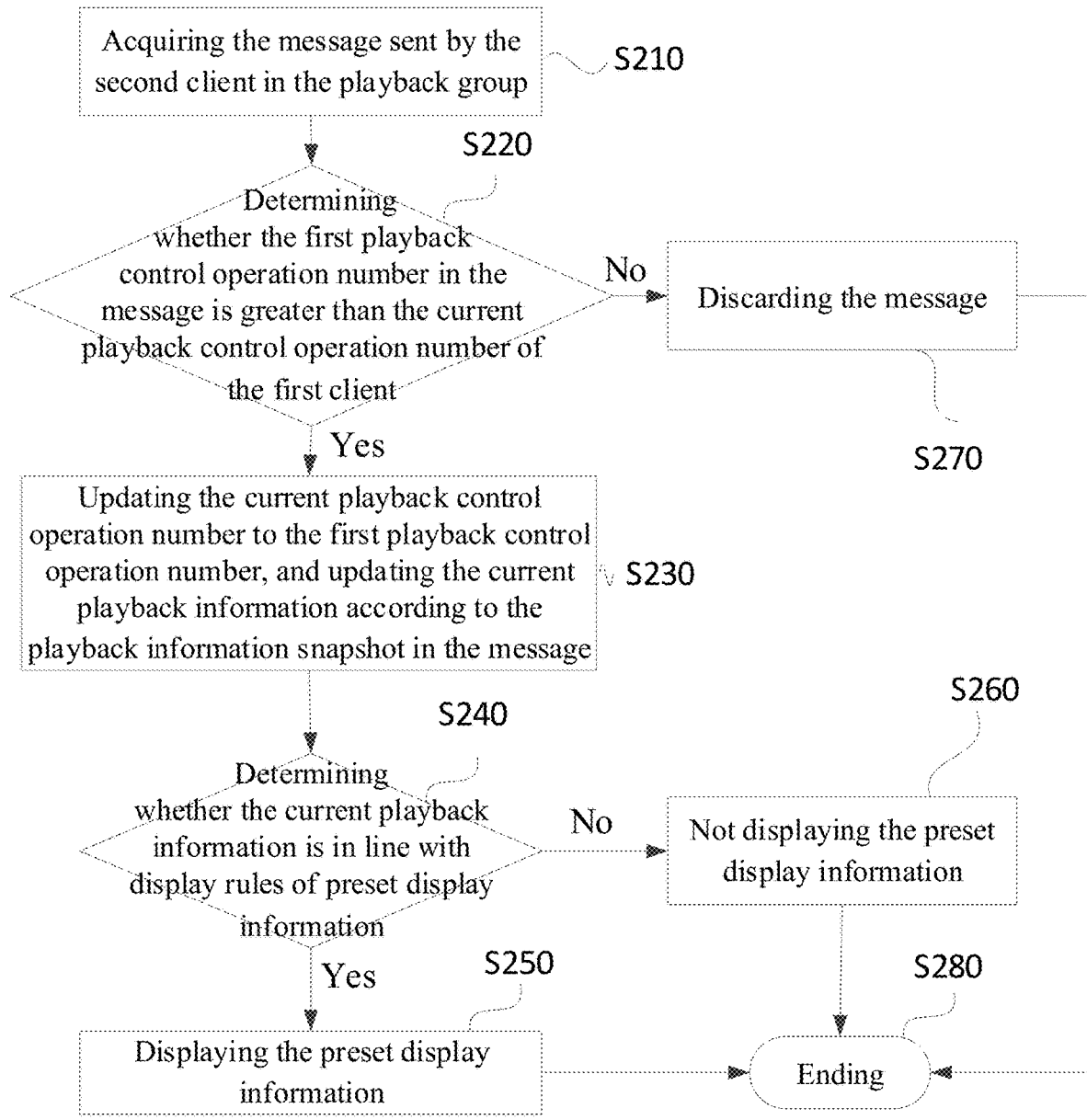
FIG. 2 is a flowchart of an embodiment of another synchronous playback method of the present disclosure.

FIG. 2 is a synchronous playback method provided by embodiment 2 of the present disclosure. This embodiment is further concretized based on the above embodiment. In the embodiment of the present disclosure, after the current playback information is updated according to the playback information snapshot in the message, whether the current playback information meets the display condition of the preset display information is determined. The method specifically includes:

S210: acquiring the message sent by the second client in the playback group; and executing S220.

S220: determining whether the first playback control operation number in the message is greater than the current playback control operation number of the first client; in the case where the first playback control operation number in the message is greater than the current playback control operation number of the first client, executing S230; in the case where the first playback control operation number in the message is smaller than the current playback control operation number of the first client, executing S270.

S230: updating the current playback control operation number to the first playback control operation number, and updating the current playback information according to the playback information snapshot in the message; and executing S240.

S240: determining whether the current playback information is in line with display rules of preset display information; in the case where the current playback information is in line with display rules of preset display information, executing S250; in the case where the current playback information is not in line with display rules of preset display information, executing S260.

The preset display information may include dynamic special effect information, such as double likes dynamic effect and double favorites dynamic effect; in the case where two likes have been acquired in the current playback information, the client will display the matching double likes dynamic effect; in the case where two favorites have been acquired in the current playback information, the client will display the matching double favorites dynamic effect; the preset display information may also include static prompt information, such as prompting the user to play the next song soon; in the case where the remaining playback time of the current playback song is less than 10 seconds, the client will display the above prompt information to prompt the user that the next song is about to be played. Therefore, after the first client updates the current playback information according to the playback information snapshot sent by the second client, in the case where it is determined that two likes have been displayed in the current playback information, it is determined that the current playback information is in line with the display rules of the double likes dynamic effect; in the case where it is determined that two favorites have been displayed in the current playback information, it is determined that the current playback information is in line with the display rules of the double favorites dynamic effect; in the case where it is determined that the remaining playback time in the current playback information is less than 10 seconds, it is determined that the current playback information is in line with the display rules for the next song to be played.

Optionally, in the embodiments of the present disclosure, the message further includes a playback control operation type; determining whether the current playback information is in line with the display rules of the preset display information includes: acquiring the playback control operation type in the message and acquiring the preset display information that matches the playback control operation type; determining whether the current playback information is in line with the display rules of the preset display information. The messages sent by the client not only include the playback control count value and intra group serial number, but also the playback control operation type of this playback control operation; the first client acquires the playback control operation type according to the message sent by the second client, and acquires the matching preset display information according to the playback control operation type; taking the above technical solution as an example, in the case where the acquired playback control operation type is like, the preset display information is the double likes dynamic effect; in the case where the acquired playback control operation type is favorite, the preset display information is the double favorite dynamic effect; in the case where the acquired playback control operation type is adjusting the playback progress, the preset display information is that the next song will be played soon; then, according to the acquired preset display information, it can be determined whether the current playback information is in line with the display rules of the preset display information, which avoids matching the current playback information with the display rules of multiple preset display information one by one, and greatly improves the matching efficiency between the current playback information and the display rules.

Optionally, in the embodiments of the present disclosure, after determining that the current playback information is in line with the display rules of the preset display information, the method further includes: determining whether the software version of the first client meets a software version requirement of the preset display information; in the case where the software version of the first client does not meet the software version requirement of the preset display information, not displaying the preset display information, and issuing a software version update prompt to guide the user to complete the software version update of the first client; in which displaying the preset display information includes: in the case where the software version of the first client meets the software version requirements of the preset display information, displaying the preset display information. Different preset display information has different requirements for software versions. For example, the double likes dynamic effect requires that the software version is 4.0 or above, and the double favorites dynamic effect requires that the software version is 5.0 or above. In the case where the software version of the client used by the user is too low, the above special effect information cannot be displayed. Therefore, by issuing the software version update prompt, the user is guided to complete the software version update of the client, ensuring that the preset display information can be displayed normally and achieving software update guidance on the user side while improving the user experience.

S250: displaying the preset display information; and executing S280.

S260: not displaying the preset display information; and executing S280.

S270: discarding the message; and executing S280.

S280: ending.

In the technical solution of the embodiments of the present disclosure, after updating the current playback information according to the playback information snapshot in the message, determining whether the current playback information is in line with the display rules of the preset display information, and displaying the preset display information when it is determined that the current playback information is in line with the display rules of the preset display information, which improves the sharing experience of the user. At the same time, according to the playback control operation type in the message, the current playback information is matched with specific display rules of the preset display information, thereby greatly improving the efficiency of the matching between the current playback information and the display rules.

Embodiment 3

FIG. 3 is a synchronous playback method provided by embodiment 3 of the present disclosure. This embodiment is further concretized based on the above embodiment. In the embodiments of the present disclosure, the first client sends messages to other clients in the playback group, and the method includes:

S310: in response to acquiring the playback control operation of the first client, acquiring a second playback control operation number of the playback control operation; the second playback control operation number includes a playback control count value and an intra group serial number of the first client.

S320: updating the current playback control operation number of the first client to the second playback control operation number, and updating the current playback information according to the playback control operation.

Specifically, after the first client updates the current playback information according to the playback control operation, the first client can determine whether to display the preset display information by determining whether the current playback information is in line with the display rules of the preset display information; the first client can also acquire the playback control operation type of the playback control operation, and acquire the preset display information that matches the playback control operation type, thereby determining whether the current playback information is in line with the display rules of the preset display information; the first client can also determine whether the software version of the first client meets the software version requirement of the preset display information; in the case where it does not meet the requirement, a software version update prompt will be issued to guide the user to complete the software version update of the first client.

S330: sending the second playback control operation number and playback information snapshot to other clients in the playback group through a message to guide the other clients to update their current playback control operation numbers and current playback information according to the message.

After acquiring the message sent by the first client, the other clients use the technical solution disclosed in the above embodiments to compare the acquired playback control operation number in the message with their current playback control operation number, and then determine whether to update their current playback control operation number and playback information.

In the technical solution of the embodiments of the present disclosure, after acquiring the playback control operation, acquiring the second playback control operation number of the playback control operation, updating the current playback control operation number to the second playback control operation number, and updating the current playback information according to the playback control operation. Then, the second playback control operation number and the playback information snapshot are sent to other clients in the playback group through messages, thereby ensuring the consistency of playback information in the playback group and improving the sharing participation degree of the user.

Embodiment 4

FIG. 4 is a structural block diagram of a synchronous playback device provided by embodiment 4 of the present disclosure, which include: a playback control operation number determination module 410, a playback control operation number update module 420, and a message discard module 430.

The playback control operation number determination module 410 is configured to, in response to acquiring a message sent by a second client in the playback group, determine whether a first playback control operation number in the message is greater than a current playback control operation number of the first client; the first playback control operation number includes a playback control count value and an intra group serial number of the second client in the playback group.

The playback control operation number update module 420 is configured to update the current playback control operation number to the first playback control operation number in a case where the first playback control operation number is greater than the current playback control operation number, and update the current playback information according to a playback information snapshot in the message.

The message discard module 430 is configured to discard the message in a case where the first playback control operation number is smaller than the current playback control operation number.

In the technical solution of the embodiments of the present disclosure, acquiring the message sent by other clients in the playback group, and when it is determined that the first playback control operation number in the message is greater than the current playback control operation number of the current client, updating the current playback control operation number to the first playback control operation number, and updating the current playback information according to the playback information snapshot in the message, so that all users in the playback group have the same control permissions, thereby improving the sharing participation degree of the user and ensuring the consistency of playback information in the playback group. When it is determined that the first playback control operation number is smaller than the current playback control operation number, discarding the message to avoid the playback control operations of network abnormal clients to cause the playback information of normal network clients to bounce back, thereby ensuring the continuity of playback information.

Optionally, on the basis of the above technical solution, the synchronous playback device further includes:
a playback control operation number acquisition module, configured to acquire a second playback control operation number of the playback control operation in response to acquiring the playback control operation of the first client; the second playback control operation number includes a playback control count value and an intra group serial number of the first client;
a playback information update module, configured to update the current playback control operation number of the first client to the second playback control operation number, and update the current playback information according to the playback control operation; and
a message sending module, configured to send the second playback control operation number and the playback information snapshot to other clients in the playback group through a message, to guide the other clients to update their respective current playback control operation numbers and current playback information according to the message.

Optionally, on the basis of the above technical solution, the playback control operation number determination module 410 includes:
an intra group serial number determination unit, configured to determine whether the intra group serial number of the first playback control operation number is greater than the intra group serial number of the current playback control operation number in the case where the playback control count value of the first playback control operation number is equal to the playback control count value of the current playback control operation number; in the case where the intra group serial number of the first playback control operation number is greater than the intra group serial number of the current playback control operation number, it is determined that the first playback control operation number is smaller than the current playback control operation number; in the case where the intra group serial number of the first playback control operation number is smaller than the intra group serial number of the current playback control operation number, it is determined that the first playback control operation number is greater than the current playback control operation number.

Optionally, on the basis of the above technical solution, the first playback control operation number further includes playback control triggering time.

Optionally, on the basis of the above technical solution, the playback control operation number determination module 410 includes:
a playback control triggering time determination unit, configured to determine whether the playback control triggering time of the first playback control operation number is closer to the current time than the playback control triggering time of the current playback control operation number in the case where the playback control count value of the first playback control operation number is equal to the playback control count value of the current playback control operation number; in the case where the playback control triggering time of the first playback control operation number is closer to the current time than the playback control triggering time of the current playback control operation number, it is determined that the first playback control operation number is greater than the current playback control operation number; in the case where the playback control triggering time of the first playback control operation number is further from the current time than the playback control triggering time of the current playback control operation number, it is determined that the first playback control operation number is smaller than the current playback control operation number.

Optionally, on the basis of the above technical solution, the synchronous playback device further includes:

a display rule determination module, configured to determine whether the current playback information is in line with display rules of the preset display information; in the case where it is determined that the current playback information is in line with the display rules of the preset display information, display the preset display information; in the case where it is determined that the current playback information is not in line with the display rules of the preset display information, not display the preset display information.

Optionally, on the basis of the above technical solution, the message further includes the playback control operation type.

Optionally, on the basis of the above technical solution, the display rule determination module is specifically configured to acquire the playback control operation type in the message and acquire the preset display information that matches the playback control operation type; and determine whether the current playback information is in line with the display rules of the preset display information.

Optionally, on the basis of the above technical solution, the synchronous playback device further includes:

a software version requirement determination module, configured to determine whether the software version of the first client meets the software version requirement of the preset display information; in the case where the software version of the first client does not meet the software version requirement of the preset display information, not display the preset display information, and issue a software version update prompt to guide the user to complete the software version update of the first client; in the case where the software version of the first client meets the software version requirement of the preset display information, display the preset display information.

The above device can execute the synchronous playback method provided by any embodiment of the present disclosure, and has corresponding functional modules for executing the method. Technical details not fully described in this embodiment can be found in the method provided by any embodiment of the present disclosure.

Embodiment 5

Figure 5:
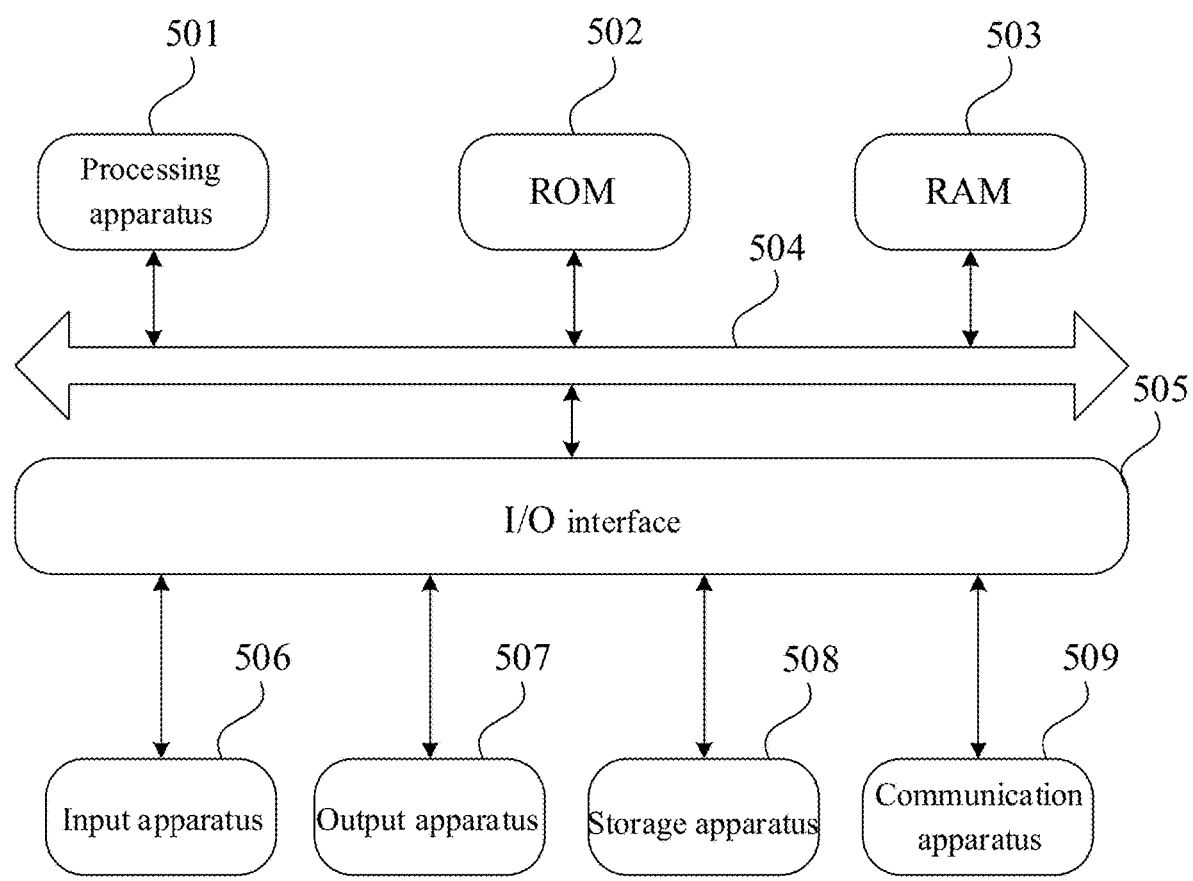
FIG. 5 is a structural block diagram of a terminal device in the embodiment 5 of the present disclosure.

FIG. 5 shows a structural schematic diagram suitable for implementing the terminal device 500 in the embodiments of the present disclosure. The terminal device in the embodiments of the present disclosure may include but not be limited to a mobile terminal such as a mobile phone, a notebook computer, a digital broadcasting receiver, a personal digital assistant (PDA), a PAD (tablet computer), a portable multimedia player (PMP), a vehicle terminal (such as a vehicle navigation terminal), and a fixed terminal such as a digital television (TV) and a desktop computer. The terminal device shown in FIG. 5 is only an example and should not impose any limitations on the functions and use scopes of the embodiments of the present disclosure.

As shown in FIG. 5, the terminal device 500 may include a processing apparatus (such as a central processing unit, and a graphics processor) 501, it may execute various appropriate actions and processes according to a program stored in a read-only memory (ROM) 502 or a program loaded from a storage apparatus 508 to a random access memory (RAM) 503. In RAM 503, various programs and data required for operations of the terminal device 500 are also stored. The processing apparatus 501, ROM 502, and RAM 503 are connected to each other by a bus 504. An input/output (I/O) interface 505 is also connected to the bus 504.

Typically, the following apparatuses may be connected to the I/O interface 505: an input apparatus 506 such as a touch screen, a touchpad, a keyboard, a mouse, a camera, a microphone, an accelerometer, and a gyroscope; an output apparatus 507 such as a liquid crystal display (LCD), a loudspeaker, and a vibrator; a storage apparatus 508 such as a magnetic tape, and a hard disk drive; and a communication apparatus 509. The communication apparatus 509 may allow the terminal device 500 to wireless-communicate or wire-communicate with other devices so as to exchange data. Although IG. 5 shows the terminal device 500 with various apparatuses, it should be understood that it is not required to implement or possess all the apparatuses shown. Alternatively, it may implement or possess the more or less apparatuses.

Specifically, according to the embodiments of the present disclosure, the process described above with reference to the flow diagram may be achieved as a computer software program. For example, an embodiment of the present disclosure includes a computer program product, it includes a computer program loaded on a non-transient computer-readable medium, and the computer program contains a program code for executing the method shown in the flow diagram. In such an embodiment, the computer program may be downloaded and installed from the network by the communication apparatus 509, or installed from the storage apparatus 508, or installed from ROM 502. When the computer program is executed by the processing apparatus 501, the above functions defined in the method in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The above-mentioned computer-readable medium may be included in the above-mentioned electronic device, or may also exist alone without being assembled into the electronic device.

The above-mentioned computer-readable medium carries at least one program, and when the at least one program is executed by the electronic device, the terminal device is caused to: in response to acquiring a message sent by a second client in a playback group, determine whether a first playback control operation number in the message is greater than a current playback control operation number of the first client; in which the first playback control operation number includes a playback control count value and an intra group serial number of the second client in the playback group; in the case where the first playback control operation number is greater than the current playback control operation number, update the current playback control operation number to the first playback control operation number, and update current playback information according to a playback information snapshot in the message; and in the case where the first playback control operation number is smaller than the current playback control operation number, discard the message.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules involved in the embodiments of the present disclosure may be implemented in software or hardware. Among them, the name of the module does not constitute a limitation of the unit itself under certain circumstances. For example, the message discard module can be described as "a module for discarding the message in the case where the first playback control operation number is smaller than the current playback control operation number". The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to at least one embodiment of the present disclosure, example one provides a synchronous playback method, which includes:

in response to acquiring a message sent by a second client in a playback group, determining whether a first playback control operation number in the message is greater than a current playback control operation number of the first client; in which the first playback control operation number includes a playback control count value and an intra group serial number of the second client in the playback group;

in the case where the first playback control operation number is greater than the current playback control operation number, updating the current playback control operation number to the first playback control operation number, and updating current playback information according to a playback information snapshot in the message; and in the case where the first playback control operation number is smaller than the current playback control operation number, discarding the message.

According to at least one embodiment of the present disclosure, example two provides the method of example one, which further includes:

in response to acquiring a playback control operation of the first client, acquiring a second playback control operation number of the playback control operation; in which the second playback control operation number includes a playback control count value and an intra group serial number of the first client;

updating the current playback control operation number of the first client to the second playback control operation number, and updating the current playback information according to the playback control operation; and sending the second playback control operation number and the playback information snapshot to other clients in the playback group through a message to guide the other clients to update their current playback control operation numbers and current playback information according to the message.

According to at least one embodiment of the present disclosure, example three provides the method of example one, which further includes:

in the case where the playback control count value of the first playback control operation number is equal to a playback control count value of the current playback control operation number, determining whether the intra group serial number of the first playback control operation number is greater than an intra group serial number of the current playback control operation number;

in the case where the intra group serial number of the first playback control operation number is greater than the intra group serial number of the current playback control operation number, determining that the first playback control operation number is smaller than the current playback control operation number; and in the case where the intra group serial number of the first playback control operation number is smaller than the intra group serial number of the current playback control operation number, determining that the first playback control operation number is greater than the current playback control operation number.

According to at least one embodiment of the present disclosure, example four provides the method of example one, the first playback control operation number further includes playback control triggering time, the method further includes:

In the case where the playback control count value of the first playback control operation number is equal to the playback control count value of the current playback control operation number, determining whether the playback control triggering time of the first playback control operation number is closer to current time than playback control triggering time of the current playback control operation number;

in the case where the playback control triggering time of the first playback control operation number is closer to the current time than the playback control triggering time of the current playback control operation number, determining that the first playback control operation number is greater than the current playback control operation number; and in the case where the playback control triggering time of the first playback control operation number is further from the current time than the playback control triggering time of the current playback control operation number, determining that the first playback control operation number is smaller than the current playback control operation number.

According to at least one embodiment of the present disclosure, example five provides the method of example one, which further includes:

determining whether current playback information is in line with display rules of preset display information;

in the case where the current playback information is determined to be in line with the display rules of the preset display information, displaying the preset display information; and in the case where the current playback information is determined to be not in line with the display rules of the preset display information, not displaying the preset display information.

According to at least one embodiment of the present disclosure, example six provides the method of example five, the message further includes a playback control operation type; the method further includes:

acquiring the playback control operation type in the message and acquiring preset display information that matches the playback control operation type; and determining whether the current playback information is in line with the display rules of the preset display information.

According to at least one embodiment of the present disclosure, example seven provides the method of example five or six, which further includes:

determining whether a software version of the first client meets a software version requirement for the preset display information;

in the case where the software version of the first client does not meet the software version requirement for the preset display information, not displaying the preset display information, and issuing a software version update prompt to guide a user to complete a software version update of the first client;

in the case where the software version of the first client meets the software version requirement for the preset display information, displaying the preset display information.

According to at least one embodiment of the present disclosure, example eight provides a synchronous playback device, which includes:

a playback control operation number determination module, configured to, in response to receiving a message sent by a second client in a playback group, determine whether a first playback control operation number in the message is greater than a current playback control operation number of a first client; in which the first playback control operation number includes a playback control count value and an intra group serial number of the second client in the playback group;

a playback control operation number update module, configured to update the current playback control operation number to the first playback control operation number in the case where the first playback control operation number is greater than the current playback control operation number, and update the current playback information according to a playback information snapshot in the message; and a message discard module, configured to discard the message in the case where the first playback control operation number is smaller than the current playback control operation number.

According to at least one embodiment of the present disclosure, example nine provides the device of example eight, which further includes:
- a playback control operation number acquisition module, configured to acquire a second playback control operation number of the playback control operation in response to acquiring the playback control operation of the first client; the second playback control operation number includes a playback control count value and an intra group serial number of the first client;
- a playback information update module, configured to update the current playback control operation number of the first client to the second playback control operation number, and update the current playback information according to the playback control operation; and
- a message sending module, configured to send the second playback control operation number and the playback information snapshot to other clients in the playback group through a message, to guide the other clients to update their respective current playback control operation numbers and current playback information according to the message.

According to at least one embodiment of the present disclosure, example ten provides the device of example eight, the playback control operation number determination module includes:
- an intra group serial number determination unit, configured to determine whether the intra group serial number of the first playback control operation number is greater than the intra group serial number of the current playback control operation number in the case where the playback control count value of the first playback control operation number is equal to the playback control count value of the current playback control operation number; in the case where the intra group serial number of the first playback control operation number is greater than the intra group serial number of the current playback control operation number, it is determined that the first playback control operation number is smaller than the current playback control operation number; in the case where the intra group serial number of the first playback control operation number is smaller than the intra group serial number of the current playback control operation number, it is determined that the first playback control operation number is greater than the current playback control operation number.

According to at least one embodiment of the present disclosure, example eleven provides the device of example eight, the first playback control operation number further includes playback control triggering time, the playback control operation number determination module includes:
- a playback control triggering time determination unit, configured to determine whether the playback control triggering time of the first playback control operation number is closer to the current time than the playback control triggering time of the current playback control operation number in the case where the playback control count value of the first playback control operation number is equal to the playback control count value of the current playback control operation number; in the case where the playback control triggering time of the first playback control operation number is closer to the current time than the playback control triggering time of the current playback control operation number, it is determined that the first playback control operation number is greater than the current playback control operation number; in the case where the playback control triggering time of the first playback control operation number is further from the current time than the playback control triggering time of the current playback control operation number, it is determined that the first playback control operation number is smaller than the current playback control operation number.

According to at least one embodiment of the present disclosure, example twelve provides the device of example eight, which further includes:
- a display rule determination module, configured to determine whether the current playback information is in line with display rules of the preset display information; in the case where it is determined that the current playback information is in line with the display rules of the preset display information, display the preset display information; in the case where it is determined that the current playback information is not in line with the display rules of the preset display information, not display the preset display information.

According to at least one embodiment of the present disclosure, example thirteen provides the device of example twelve, the message further includes the playback control operation type.

The display rule determination module is configured to acquire the playback control operation type in the message and acquire the preset display information that matches the playback control operation type; and determine whether the current playback information is in line with the display rules of the preset display information.

According to at least one embodiment of the present disclosure, example fourteen provides the device of example twelve or thirteen, which further includes:
- a software version requirement determination module, configured to determine whether the software version of the first client meets the software version requirement of the preset display information; in the case where the software version of the first client does not meet the software version requirement of the preset display information, not display the preset display information, and issue a software version update prompt to guide the user to complete the software version update of the first client; in the case where the software version of the first client meets the software version requirement of the preset display information, display the preset display information.

According to at least one embodiment of the present disclosure, example fifteen provides a terminal device, which includes a memory, a processing device, and a computer program stored in the memory and capable of running on the processing device, the processing device implements the synchronous playback method in any one of examples 1-7 when executing the computer program.

According to at least one embodiment of the present disclosure, example sixteen provides a storage medium including a computer executable instruction, the computer executable instruction is configured to execute the synchronous playback method in any one of examples 1-7 when executed by a computer processor.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

The invention claimed is:

1. A synchronous playback method, applied in a first client, and comprising:
   in response to acquiring a message sent by a second client in a playback group, determining whether a first playback control operation number in the message is greater than a current playback control operation number of the first client; wherein the first playback control operation number comprises a playback control count value and an intra group serial number of the second client in the playback group;
   in response to the first playback control operation number being greater than the current playback control operation number, updating the current playback control operation number to the first playback control operation number, and updating current playback information according to a playback information snapshot in the message; and
   in response to the first playback control operation number being smaller than the current playback control operation number, discarding the message.

2. The method according to claim 1, further comprising:
   in response to acquiring a playback control operation of the first client, acquiring a second playback control operation number of the playback control operation; wherein the second playback control operation number comprises a playback control count value and an intra group serial number of the first client;
   updating the current playback control operation number of the first client to the second playback control operation number, and updating the current playback information according to the playback control operation; and
   sending the second playback control operation number and the playback information snapshot to other clients other than the first client in the playback group through a message to guide the other clients other than the first client to update their current playback control operation numbers and current playback information according to the message.

3. The method according to claim 1, wherein determining whether the first playback control operation number in the message is greater than the current playback control operation number of the first client comprises:
   in response to the playback control count value of the first playback control operation number being equal to a playback control count value of the current playback control operation number, determining whether the intra group serial number of the first playback control operation number is greater than an intra group serial number of the current playback control operation number;
   in response to the intra group serial number of the first playback control operation number being greater than the intra group serial number of the current playback control operation number, determining that the first playback control operation number is smaller than the current playback control operation number; and
   in response to the intra group serial number of the first playback control operation number being smaller than the intra group serial number of the current playback control operation number, determining that the first playback control operation number is greater than the current playback control operation number.

4. The method according to claim 1, wherein the first playback control operation number further comprises playback control triggering time;
   determining whether the first playback control operation number in the message is greater than the current playback control operation number of the first client further comprises:
   in response to the playback control count value of the first playback control operation number being equal to the playback control count value of the current playback control operation number, determining whether the playback control triggering time of the first playback control operation number is closer to current time than playback control triggering time of the current playback control operation number;
   in response to the playback control triggering time of the first playback control operation number being closer to the current time than the playback control triggering time of the current playback control operation number, determining that the first playback control operation number is greater than the current playback control operation number; and
   in response to the playback control triggering time of the first playback control operation number being further from the current time than the playback control triggering time of the current playback control operation number, determining that the first playback control operation number is smaller than the current playback control operation number.

5. The method according to claim 1, wherein after updating the current playback information according to the playback information snapshot in the message, the method further comprises:
   determining whether current playback information is in line with display rules of preset display information;
   in response to the current playback information being determined to be in line with the display rules of the preset display information, displaying the preset display information; and
   in response to the current playback information being determined to be not in line with the display rules of the preset display information, not displaying the preset display information.

6. The method according to claim 5, wherein the message further comprises a playback control operation type;
   determining whether the current playback information is in line with the display rules of the preset display information comprises:
   acquiring the playback control operation type in the message and acquiring preset display information that matches the playback control operation type; and
   determining whether the current playback information is in line with the display rules of the preset display information.

7. The method according to claim 5, wherein after determining that the current playback information is in line with the display rules of the preset display information, the method further comprises:

determining whether a software version of the first client meets a software version requirement for the preset display information;

in response to the software version of the first client not meeting the software version requirement for the preset display information, not displaying the preset display information, and issuing a software version update prompt to guide a user to complete a software version update of the first client;

displaying the preset display information comprises:

in response to the software version of the first client meeting the software version requirement for the preset display information, displaying the preset display information.

8. The method according to claim 6, wherein after determining that the current playback information is in line with the display rules of the preset display information, the method further comprises:

determining whether a software version of the first client meets a software version requirement for the preset display information;

in response to the software version of the first client not meeting the software version requirement for the preset display information, not displaying the preset display information, and issuing a software version update prompt to guide a user to complete a software version update of the first client;

displaying the preset display information comprises:

in response to the software version of the first client meeting the software version requirement for the preset display information, displaying the preset display information.

9. A terminal device, comprising a memory, a processing device, and a computer program stored in the memory and capable of running on the processing device, wherein the processing device implements a synchronous playback method when executing the computer program, the method comprises:

in response to acquiring a message sent by a second client in a playback group, determining whether a first playback control operation number in the message is greater than a current playback control operation number of the first client; wherein the first playback control operation number comprises a playback control count value and an intra group serial number of the second client in the playback group;

in response to the first playback control operation number being greater than the current playback control operation number, updating the current playback control operation number to the first playback control operation number, and updating current playback information according to a playback information snapshot in the message; and in response to the first playback control operation number being smaller than the current playback control operation number, discarding the message.

10. The terminal device according to claim 9, wherein method further comprises:

in response to acquiring a playback control operation of the first client, acquiring a second playback control operation number of the playback control operation; wherein the second playback control operation number comprises a playback control count value and an intra group serial number of the first client;

updating the current playback control operation number of the first client to the second playback control operation number, and updating the current playback information according to the playback control operation; and sending the second playback control operation number and the playback information snapshot to other clients other than the first client in the playback group through a message to guide the other clients other than the first client to update their current playback control operation numbers and current playback information according to the message.

11. The terminal device according to claim 9, wherein determining whether the first playback control operation number in the message is greater than the current playback control operation number of the first client comprises:

in response to the playback control count value of the first playback control operation number being equal to a playback control count value of the current playback control operation number, determining whether the intra group serial number of the first playback control operation number is greater than an intra group serial number of the current playback control operation number;

in response to the intra group serial number of the first playback control operation number being greater than the intra group serial number of the current playback control operation number, determining that the first playback control operation number is smaller than the current playback control operation number; and in response to the intra group serial number of the first playback control operation number being smaller than the intra group serial number of the current playback control operation number, determining that the first playback control operation number is greater than the current playback control operation number.

12. The terminal device according to claim 9, wherein the first playback control operation number further comprises playback control triggering time;

determining whether the first playback control operation number in the message is greater than the current playback control operation number of the first client further comprises:

in response to the playback control count value of the first playback control operation number being equal to the playback control count value of the current playback control operation number, determining whether the playback control triggering time of the first playback control operation number is closer to current time than playback control triggering time of the current playback control operation number;

in response to the playback control triggering time of the first playback control operation number being closer to the current time than the playback control triggering time of the current playback control operation number, determining that the first playback control operation number is greater than the current playback control operation number; and in response to the playback control triggering time of the first playback control operation number being further from the current time than the playback control triggering time of the current playback control operation number, determining that the first playback control operation number is smaller than the current playback control operation number.

13. The terminal device according to claim 9, wherein after updating the current playback information according to the playback information snapshot in the message, the method further comprises:

determining whether current playback information is in line with display rules of preset display information;

in response to the current playback information being determined to be in line with the display rules of the preset display information, displaying the preset display information; and in response to the current playback information being determined to be not in line with the display rules of the preset display information, not displaying the preset display information.

14. The terminal device according to claim 13, wherein the message further comprises a playback control operation type;

determining whether the current playback information is in line with the display rules of the preset display information comprises:

acquiring the playback control operation type in the message and acquiring preset display information that matches the playback control operation type; and determining whether the current playback information is in line with the display rules of the preset display information.

15. The terminal device according to claim 13, wherein after determining that the current playback information is in line with the display rules of the preset display information, the method further comprises:

determining whether a software version of the first client meets a software version requirement for the preset display information;

in response to the software version of the first client not meeting the software version requirement for the preset display information, not displaying the preset display information, and issuing a software version update prompt to guide a user to complete a software version update of the first client;

displaying the preset display information comprises:

in response to the software version of the first client meeting the software version requirement for the preset display information, displaying the preset display information.

16. A non-transitory storage medium comprising a computer executable instruction, wherein the computer executable instruction is configured to execute a synchronous playback method when executed by a computer processor, the method comprises:

in response to acquiring a message sent by a second client in a playback group, determining whether a first playback control operation number in the message is greater than a current playback control operation number of the first client; wherein the first playback control operation number comprises a playback control count value and an intra group serial number of the second client in the playback group;

in response to the first playback control operation number being greater than the current playback control operation number, updating the current playback control operation number to the first playback control operation number, and updating current playback information according to a playback information snapshot in the message; and in response to the first playback control operation number being smaller than the current playback control operation number, discarding the message.

17. The non-transitory storage medium according to claim 16, wherein method further comprises:

in response to acquiring a playback control operation of the first client, acquiring a second playback control operation number of the playback control operation; wherein the second playback control operation number comprises a playback control count value and an intra group serial number of the first client;

updating the current playback control operation number of the first client to the second playback control operation number, and updating the current playback information according to the playback control operation; and sending the second playback control operation number and the playback information snapshot to other clients other than the first client in the playback group through a message to guide the other clients other than the first client to update their current playback control operation numbers and current playback information according to the message.

18. The non-transitory storage medium according to claim 16, wherein determining whether the first playback control operation number in the message is greater than the current playback control operation number of the first client comprises:

in response to the playback control count value of the first playback control operation number being equal to a playback control count value of the current playback control operation number, determining whether the intra group serial number of the first playback control operation number is greater than an intra group serial number of the current playback control operation number;

in response to the intra group serial number of the first playback control operation number being greater than the intra group serial number of the current playback control operation number, determining that the first playback control operation number is smaller than the current playback control operation number; and in response to the intra group serial number of the first playback control operation number being smaller than the intra group serial number of the current playback control operation number, determining that the first playback control operation number is greater than the current playback control operation number.

19. The non-transitory storage medium according to claim 16, wherein the first playback control operation number further comprises playback control triggering time;

determining whether the first playback control operation number in the message is greater than the current playback control operation number of the first client further comprises:

in response to the playback control count value of the first playback control operation number being equal to the playback control count value of the current playback control operation number, determining whether the playback control triggering time of the first playback control operation number is closer to current time than playback control triggering time of the current playback control operation number;

in response to the playback control triggering time of the first playback control operation number being closer to the current time than the playback control triggering time of the current playback control operation number, determining that the first playback control operation number is greater than the current playback control operation number; and in response to the playback control triggering time of the first playback control operation number being further from the current time than the playback control triggering time of the current playback control operation number, determining that the first playback control operation number is smaller than the current playback control operation number.

* * * * *